F. A. DE LAY.
MEASURING MECHANISM.
APPLICATION FILED JAN. 11, 1909.
977,516.
Patented Dec. 6, 1910.
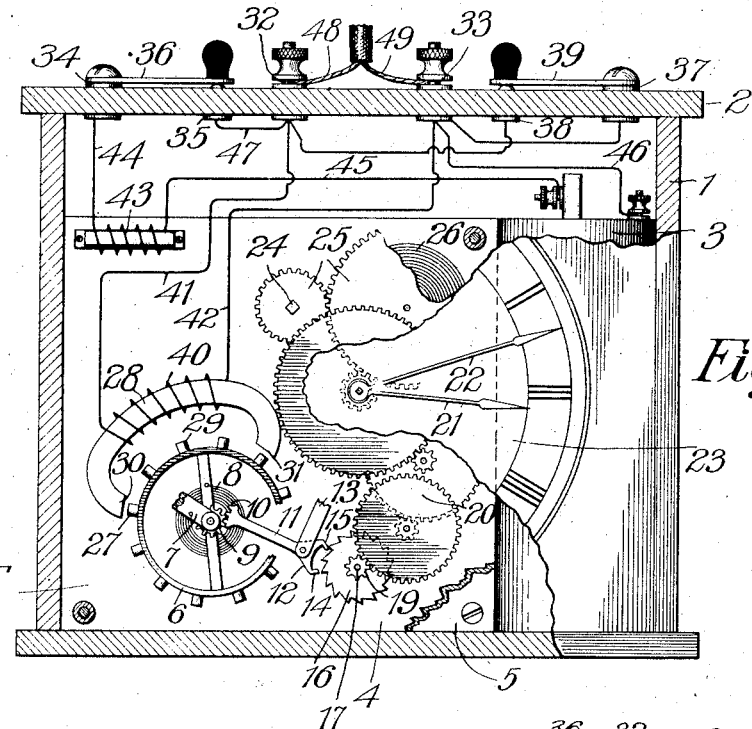

UNITED STATES PATENT OFFICE.

FREDERIC A. DE LAY, OF ANN ARBOR, MICHIGAN.

MEASURING MECHANISM.

977,516.

Specification of Letters Patent.

Patented Dec. 6, 1910.

Application filed January 11, 1909. Serial No. 471,592.

*To all whom it may concern:*

Be it known that I, FREDERIC A. DE LAY, a citizen of the United States, residing at Ann Arbor, in the county of Washtenaw and State of Michigan, have invented a certain new and useful Improvement in Measuring Mechanism, of which the following is a full, clear, concise, and exact description, reference being had to the accompanying drawings, forming a part of this specification.

My invention relates to measuring mechanism, particularly to such mechanism for making measurements involving a time element.

My invention is of particular importance in measuring systems in which the time element should be efficiently controlled to be in proper proportion with other elements to be measured. In these systems stop-watches are usually employed, but are not automatically controlled by the manipulation of other mechanism for measuring other elements of the measurement to be made. As the time element is very often read in seconds and fractions of a second, there is very apt to be discrepancy. In accordance with my invention the time mechanism is automatically controlled by the operation of the mechanisms for measuring the other elements of the measurements to be made, so that the time element will be in exact accord with the other elements. I preferably electromagnetically control the time mechanism and connect this mechanism by means of electrical conductors with the other mechanisms of this system in such fashion that when the other mechanism is set into operation, the time mechanism will automatically start, and when the other mechanism is restored to its inoperative position, the time mechanism will simultaneously be stopped. A revolution counter, for example, could be associated with the time mechanism, so that the application of the counter to the rotating member whose speed is to be determined would affect the circuit connections so that the time mechanism would start and so that disconnection of the counter from the rotating member would affect the circuits to stop the time mechanism.

In the accompanying drawings I have shown my invention applied to a revolution counting arrangement.

In this drawing Figure 1 is a front elevation view of an inclosing case containing the time mechanism and the electrical controlling mechanism therefor, the front wall being partly broken away: Fig. 2 shows the time mechanism, a revolution counter and part of a member whose rotation is to be measured, together with the controlling electrical circuits; Fig. 3 shows a modified arrangement of balance wheel and magnet; and Fig. 4 is a plan view showing the time mechanism and the counting mechanism united to form a single structure. Fig. 5 is a plan view of a modified form of counter and contact mechanism for determining the time of a predetermined number of revolutions.

Referring to Fig. 1, the case 1 is shown as of rectangular construction and provided with a cover 2. Within the case is the time mechanism represented in general by T, and a source of current such as a dry cell 3. The time mechanism frame comprises the parallel plates 4 and 5 suitably secured together, and between which the various shafts for the time mechanism are pivoted. The balance wheel 6 is pivoted between the plate 4 and the bracket 7, the balance spring 8 being connected at one end to the bracket and at its other end to the balance wheel, as well understood in the art. Secured to rotate concentrically with the balance wheel is the pinion 9, which meshes with the teeth 10 at the end of the arm 11 extending from the escapement pawl 12, pivoted between plate 4 and bracket 13. The teeth 14, 15 of this escapement pawl coöperate with the escapement wheel 16 in the well-known manner. This escapement wheel is secured to and rotates the arbor 17, to which is secured a second-hand 18. The arbor 17 also carries the pinion 19, which imparts movement to a train 20 of gears, which train connects with the hour and minute hands 21 and 22 to cause said hands to travel about the face 23 in a manner well understood in the art. A winding stem 24 connects with gear train 25, so that the main-spring 26 can be wound, which spring is connected with the other clockwork in a manner well understood. In clockwork the balance wheel is usually of non-magnetic material. In accordance with my invention I provide an armature extension 27 on the balance wheel, and adjacent the path of said armature extension I arrange an electromagnet frame 28 so that when the electromagnet frame is magnetized, the armature will be attracted and the balance wheel and the time mechanism stopped. The balance wheels are usually provided with a plurality of weights 29 extending radially from the periphery thereof, and these weights are also of non-magnetic material. For the purposes of my invention, one of the weights could be of magnetic material, and with this arrangement the perfect balance of the balance wheel would not be affected. The magnet frame should be preferably arranged so that the balance wheel will be held at either end of its oscillation angle. This causes the time element to be more accurate and dead center effects will be avoided, the full force of the balance spring being active whenever the magnetism is again withdrawn, so that starting of the balance wheel and time mechanism is assured after each stoppage thereof. The magnet frame can therefore be of horse-shoe shape, as shown, with its poles 30 and 31 arranged at the ends of the oscillation angle.

The cover 2 carries the main binding posts 32 and 33, switch contacts 34 and 35 adapted to be connected by switch plate 36, and switch contacts 37 and 38 adapted to be connected by switch plate 39. As shown, the electro-magnet winding 40 connects by means of conductors 41 and 42 with binding posts 32 and 33, respectively. A resistance winding 43 is suitably supported within the case, its one terminal connecting through conductor 44 with switch contact 34 and its other terminal connecting through conductor 45 with one terminal of the battery 3, the other terminal of the battery connecting through conductor 46 with main binding post 33. Switch contact 35 connects through conductor 47 with main binding post 32. With this arrangement, if switch plate 36 is closed, the battery will be connected serially in circuit with the resistance 43 and the winding 40, the balance wheel armature being attracted and the clock mechanism at rest. If switch 36 is opened, the circuit through the winding 40 is opened and the magnetism withdrawn to allow the balance wheel to resume operation. We therefore have an electromagnetically controlled stop clock.

The operation of my device may now be clearly understood: Before measuring the amount of time which elapses during the operation of any series of movements the switch 36 should be closed and the switch 39 opened. In this way the electromagnet 28 is energized and the balance wheel 6 is held in position so that the clockwork does not operate. In order to start the operation of my device when the series of movements of a machine or other mechanism is started suitable connections are made so that when the movements of the same start the electromagnet 28 is rendered ineffective, thereby allowing the balance wheel 6 to start and the clockwork to be operated. Similarly, when the movements cease the electromagnet 28 is again rendered ineffective and the balance wheel is again stopped and the time of the series of movements is thereby indicated. When the switch 36 is closed, by also closing the switch 39 the electromagnet 28 is short-circuited and will not be energized, and the balance wheel will be allowed to move. It is evident that automatically making electrical connections analogous to those of the switch 39 will close a shunt circuit, and thereby the clockwork will be started, whereas, when the shunt circuit is automatically opened, the clockwork will be stopped. The special application of this general principle to the operation of the counter for determining the speed of revolution of shafts and the like will now be described. As shown in Fig. 2, this short circuit arrangement is used in conjunction with the revolution counter mechanism R, a conductor 48 connecting main binding post 33 with the frames of the revolution counter and a conductor 49 connecting binding post 32 with the contact member such as a spring 50, carried by an insulator from the frame of the counter. The counter shown is of the ordinary construction, the spindle 51 having the pointed end 52, and its inner end carrying worm threads 53 which mesh with the worm 54, connected to the pointer 55, traveling over a scale 56. The spring 50 extends forwardly so that when the end of spindle 51 is applied to the member to be measured such as the shaft 57, said spring will engage and make contact with the shaft, and conductors 48 and 49 will then be connected together through the frame of the counter, the spindle 51, shaft 57 and spring 50, and the electromagnet is shunted and the clock mechanism started. Simultaneously with the withdrawal of the counter from the shaft the electromagnet again becomes effective and the clock is stopped. By means of my invention, therefore, the time element is automatically obtained and no special supervision is necessary, and this time element is always in accordance with the other elements of the measurement.

As shown in Fig. 3, the electromagnet could be of horse-shoe type so that the magnet extensions 27 and 27' would move to and from a position between its poles. This arrangement would give a better magnetic circuit and the magnetic extensions could be lighter, the result being that less magnetizing current would be necessary.

Instead of having the time mechanism and counting mechanism disconnected they could be united into a single structure, as shown in Fig. 4. The time mechanism could be in the form of a watch W secured to the counter frame opposite the counter indicator, as shown, and the electromagnet 28 could be at the exterior of the watch case or at the interior thereof. Binding posts 58, 59 could be applied for connection of the device with the battery.

Fig. 5 shows a modified arrangement of contact mechanism, the control being such that the main circuit will be automatically closed at regular intervals to cause the time mechanism to register during periods each of which covers a predetermined number of revolutions, the counter remaining in contact with the member whose speed is being determined. This contact mechanism is in the form of a commutator, having the contact sector 60 and the insulating sector 61. As shown, each of the sectors extends through 180°, so that during each one-half revolution of the counter dial, the contact sector 60 will be in engagement with the brush 62, suitably mounted on, but insulated from, the frame of the counter, the commutator sector being, however, connected with the frame of the counter. Binding posts 63 and 64 serve for connecting the brush and frame, respectively, with the conductors 48 and 49. The arc of the sector 60 can be adjusted so that periods of revolutions are successively measured by the time mechanism and the speed of rotation can be readily estimated. For example, the counter could be permanently connected with an axle and the successive time indications noted. The speed of rotation and other elements could then be readily determined.

Other arrangements are also possible which would be covered by my invention. The electromagnetically controlled time mechanism could, of course, be associated with other measuring mechanisms besides the revolution counter shown, and the time mechanism could be used alone as a stop watch or clock for measuring time element. By suitably arranging the circuits, one time mechanism would serve to control a plurality of other measuring mechanisms, and a plurality of time mechanisms could also be simultaneously actuated.

Having thus described my invention, I desire to secure the following claims by Letters Patent:

1. In combination, a revolution counter, a time indicating device, electromagnetic means controlling the operation of said time indicating device, electric circuits connecting between said time indicating device and the counter, and contacts automatically actuated to control the circuits to start the time indicating device when the counter is applied to a member to measure its speed, and to control said circuits to cause stopping of the time indicating device when said counter is withdrawn from said member.

2. In combination, a time indicating device, a revolution counter, and electric means adapted to automatically start and stop the time indicating device upon application or withdrawal respectively of the counter from a member whose speed is to be measured.

3. In combination, a movement measuring device adapted to be connected with and to be driven by a member whose movement is to be measured, a time element indicating device, electromagnetic means for controlling the operation of said time element indicating device, electric circuits connecting said electromagnetic means with the movement measuring device, and contact mechanism, said contact mechanism being actuated when the movement measuring device is connected with the member to be measured to control the circuits to cause starting of the time element indicating device, and said contact mechanism being adapted upon withdrawal of the movement measuring device from said member to control the circuits to stop the time element indicating device, said devices being thereby, simultaneously started and stopped.

4. In combination, a time indicating device comprising clock-work controlled by a balance wheel, an armature carried by said balance wheel, a core adjacent the path of said armature, and means for magnetically energizing and deënergizing said core to cause stopping and to allow starting of the time indicating mechanism.

5. In combination, time indicating members driven by clock work, a balance wheel for said clockwork, an armature carried by said balance wheel, an electromagnet through whose field the armature travels, and electric circuits for controlling the energization of said electromagnet, energization of said electromagnet causing said armature to be held, whereby said balance wheel and clockwork are stopped.

6. In combination, clockwork, an oscillating balance wheel for controlling said clockwork, an armature carried by said balance wheel, an electromagnet having a pole near one end of the arc of oscillation of said armature, and electric circuits for controlling the energization of said electromagnet, energization of said electromagnet causing said armature to be held when it reaches said pole, whereby the clock mechanism is stopped.

7. In combination, clockwork, time indicating members driven by said clockwork, an oscillating balance wheel for said clock work, an armature carried by said balance wheel, an electromagnet having its poles adjacent the ends of the arc of oscillation of said armature, and electric means for controlling the energization of said electromagnet, thereby stopping said balance wheel and its associated clockwork when the armature of the balance wheel comes into the field of either of said poles.

8. In combination, time indicating members, clockwork driving said members, an armature driven by said clockwork, electromagnetic means associated with said armature and electric means for controlling the energizing of said electromagnet to attract the armature and to stop the clockwork.

9. In combination, time indicating members, clock work for driving said members, an oscillating balance wheel for controlling said clockwork, an armature carried on said wheel, a stationary electromagnet adjacent the path of the armature, an electric circuit normally controlled to cause energization of said electromagnet whereby said armature is attracted and the balance wheel and clockwork stopped, and switching means for changing the circuit positions to cause the deënergization of said electromagnet to allow oscillation of the balance wheel and movement of the clockwork.

10. In combination, a measuring instrument, a time indicating device, electromagnetic mechanism controlling the operation of said time indicating device, and automatic means for simultaneously starting and stopping said measuring instrument and said time indicating device by the application of said instrument to and its withdrawal from the member whose movement is to be measured.

11. In combination, a movement measuring instrument, a time-indicating device, electromagnetic mechanism controlling the operation of said time-indicating device, an electric circuit for said electromagnetic mechanism, and means for automatically controlling said electric circuit to start and stop said time-indicating measuring instrument is respectively applied to and taken from the member whose movement is to be measured.

12. In combination, a movement measuring instrument, a time-indicating device, electromagnetic mechanism controlling the operation of said time-indicating device, a source of current adapted to be connected in series with said electromagnetic mechanism, a manual switch controlling the connection between said source of current and said electromagnetic mechanism, a shunt circuit around said electromagnetic mechanism, and means for controlling said shunt circuit by the application of said instrument to and its withdrawal from the member whose movement is to be measured.

13. In combination, a movement measuring instrument, a time-indicating device, electromagnetic mechanism controlling the operation of said time-indicating device, a source of current adapted to be connected in series with said electromagnetic mechanism, a manual switch controlling the connection between said source of current and said electromagnetic mechanism, a shunt circuit around said electromagnetic mechanism, and switching means carried by said movement measuring instrument for automatically controlling said shunt circuit by the application of said instrument to and its withdrawal from the member whose movement is to be measured.

14. In combination, a movement measuring instrument, a time-indicating device, electromagnetic mechanism controlling the operation of said time-indicating device, a source of current adapted to be connected in series with said electromagnetic mechanism, a manual switch controlling the connection between said source of current and said electromagnetic mechanism, a shunt circuit around said electromagnetic mechanism, switching means carried by said movement measuring instrument for automatically controlling said shunt circuit by the application of said instrument to and its withdrawal from the member whose movement is to be measured, and a second shunt circuit around said electromagnetic mechanism controlled by a manual switch.

15. In combination, a movement measuring instrument, a time-indicating device, electromagnetic mechanism controlling said time indicating device, a source of current arranged to be connected in series with said electromagnetic mechanism, a resistance arranged to be connected in series with said source of current and said electromagnetic mechanism, a shunt circuit for short-circuiting said electromagnetic mechanism, and switching means for automatically closing said shunt circuit by the application of said instrument to and its withdrawal from the member whose movement is to be measured.

In witness whereof, I hereunto subscribe my name this 31st day of December, A. D. 1908.

FREDERIC A. DE LAY.

Witnesses:
LYNN A. WILLIAMS,
MARGARET A. O'BEIRNE.